United States Patent Office 3,631,123
Patented Dec. 28, 1971

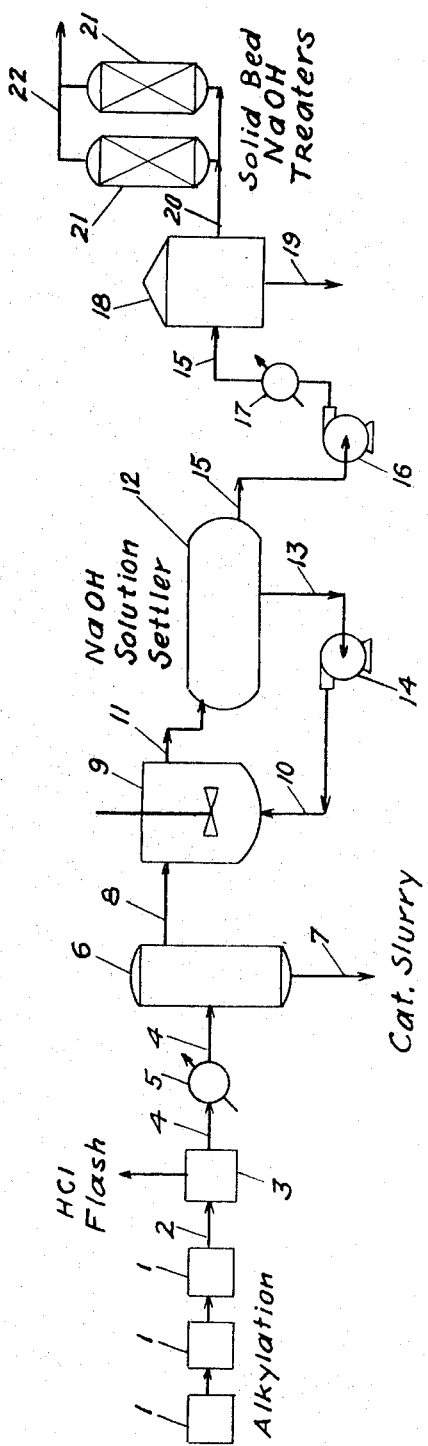

3,631,123
METHOD FOR TREATING ALKYL AROMATICS
Matthew L. Becker, Philadelphia, Pa., assignor to Atlantic Richfield Company, New York, N.Y.
Continuation-in-part of abandoned application Ser. No. 756,664, Aug. 30, 1968. This application Feb. 16, 1970, Ser. No. 11,824
Int. Cl. C07c 7/00, 3/56
U.S. Cl. 260—674 A                8 Claims

ABSTRACT OF THE DISCLOSURE

Treating alkyl aromatics made by aluminum chloride alkylation with sodium hydroxide to remove residual catalyst therefrom.

CROSS REFERENCE TO RELATED APPLICATIONS

This application is a continuation-in-part of my copending application Ser. No. 756,664, filed Aug. 30, 1968, entitled Method for Treating Alkyl Aromatics, which is now abandoned.

BACKGROUND OF THE INVENTION

Field of the invention

This invention relates to a method for treating alkyl aromatics, in particular alkylbenzenes, made by an aluminum chloride catalyzed alkylation process wherein the crude alkyl aromatics containing residual quantities of catalyst is treated with sodium hydroxide to remove the catalyst therefrom.

PRIOR ART

The alkylation of aromatic hydrocarbons, in particular benzene, with olefins or alkyl chlorides to produce the corresponding alkyl aromatics by using aluminum chloride as the alkylation catalyst has long been practiced as a step in the manufacture of alkyl aryl sulfonate detergents.

In such processes the alkyl aromatic, generally alkylbenzene, is subsequently sulfonated and neutralized to give the desired salt of the alkyl aryl sulfonic acid constituting the active detergent material. Heretofore, it has been recognized that the crude mixture of unreacted components, alkylated aromatics, high molecular weight compounds, catalyst and hydrogen chloride called "alkylate" from the alkylation process requires purification if high quality detergents are to be produced and certain processing problems are to be avoided, particularly the fouling of heat exchangers, reboilers and the like. For example, it has been found in the distillation of crude alkylates made by aluminum chloride alkylation, severe fouling of heat exchange equipment particularly preheaters and reboilers has occurred, resulting in the need for frequent down time for cleaning such fouling.

Various methods of overcoming these problems have been proposed and used such as acid treating or ammonia treating the alkylate. These methods are not economical, however, since they result in yield losses.

In accordance with the method of the present invention residual catalyst and other by-products are removed from crude alkylate without loss in yield producing an alkylate which, in subsequent processing, does not foul equipment. Thus this method provides economies in operation and, in addition, provides a finished detergent of more desirable characteristic.

SUMMARY OF THE INVENTION

The present invention is carried out by treating crude alkylates made by an aluminum chloride alkylation process with an aqueous sodium hydroxide solution, separating the aqueous sodium hydroxide solution from the alkylate and finally contacting the alkylate with solid sodium hydroxide to provide the final purification treatment.

The invention is further described by means of the drawing wherein the figure shows a schematic outline of the process.

It is an object of this invention, therefore, to provide a method for purifying crude alkyl aromatics wherein aluminum chloride is the catalyst employed in the alkylation reaction.

It is another object of this invention to provide a method for treating crude alkyl aromatics made by aluminum chloride alkylation processes to prevent the fouling of equipment utilized in handling such alkylates.

It is another object of this invention to provide a method for treating crude alkyl aromatics produced by aluminum chloride catalyzed alkylation processes wherein the crude alkylate is treated with sodium hydroxide.

It is another object of this invention to provide a method for the treatment of crude alkylbenzenes produced by aluminum chloride catalyzed alkylation wherein the crude alkylbenzenes are treated with aqueous sodium hydroxide followed by treatment with solid sodium hydroxide.

Other objects of this invention will be apparent from the description of the preferred embodiments which follow and from the claims.

DESCRIPTION OF THE PREFERRED EMBODIMENTS

This invention is applicable for the purification of alkyl aromatic hydrocarbons produced by alkylation processes utilizing aluminum chloride as the catalyst. It is particularly applicable, however, to the purification of alkylbenzenes produced by aluminum chloride alkylation and, most particularly, to alkylbenzenes wherein the alkyl group contains from between 10 to 18 carbon atoms and wherein the alkylbenzenes are subsequently sulfonated and neutralized to produce high quality anionic detergents.

In a particularly important embodiment of this invention, linear paraffins in the $C_{10}$ to $C_{18}$ range, and most preferably in the $C_{11}$ to $C_{14}$ range are monochlorinated in accordance with commercial methods to give a product containing unreacted paraffins, monochloroparaffins and small amounts of higher chlorinated paraffins. This chlorinated product is utilized to alkylate benzene using an aluminum chloride catalyst in accordance with well known methods.

In all cases, however, the alkylate produced from any of the starting materials described contains both hydrogen chloride and the aluminum chloride catalyst slurry. The major portion of the hydrogen chloride is flashed from the reactor effluent and the aluminum chloride slurry is allowed to settle from the main portion of the alkylate at a temperature of about 130° F. to 160° F.

According to the method of this invention, the crude alkylate after the hydrogen chloride flashing step and aluminum chloride slurry settling step is mixed with a circulating aqueous sodium hydroxide solution having a concentration of about 7 to 17 weight percent sodium hydroxide (10–15 percent preferred) in amounts ranging from 50 volume percent to 150 volume percent of the crude alkylate volume with about 60 to 80 volume percent preferred. At concentrations or amounts below those stated the phases do not separate as cleanly as desired whereas at concentrations or amount above those stated other problems arise such as solids separation, too high costs and the like. The mixing may be carried out at temperatures of from 110° F. to 170° F., however, it is preferred to use temperatures in the range of from 140° F. to 160° F. This contacting step converts the aluminum chloride to sodium aluminate and sodium chloride and converts the dissolved residual hydrogen chloride to sodium chloride.

The mixture from the sodium hydroxide treating step is separated in a settling vessel. The sodium hydroxide layer being recycled until no longer effective. When the sodium hydroxide solution is spent it is almost completely discarded and fresh sodium hydroxide solution is added to replenish the supply.

The sodium hydroxide-washed crude alkylate is thereafter cooled to about 105° F. in order to settle out dissolved water and is then passed through one or more beds of solid, flake or lump sodium hydroxide for final cleanup. Potassium hydroxide can also be used but offers no advantages and is not preferred because of its greater cost.

The invention may be described further by reference to the drawing wherein the numeral 1 refers to one or more alkylation reactors, effluent from the alkylation step is passed through line 2 into flash drum 3 in which hydrogen chloride is flushed from the alkylate. The alkylate is passed by line 4, preferably through a cooler 5, to slurry separator 6. from which aluminum chloride slurry is settled and removed through line 7, being recycled to the alkylation step (not shown). The crude alkylate from the aluminum chloride slurry separator 6 is passed by line 8 into mixer vessel 9 wherein it is admixed with the aqueous sodium hydroxide solution from line 10. The sodium hydroxide treated alkylate is removed from the mixer vessel 9 through line 11 to the sodium hydroxide solution settler 12. The sodium hydroxide layer is removed from the vessel through line 13 and is returned by means of pump 14 and line 10 to mixer vessel 9. The treated alkylate is removed from the sodium hydroxide solution settler by line 15 and passed by means of pump 16, cooler 17, into water settler 18, from the water is removed by line 19. The alkylate is removed from water settler 18 by line 20 and passed through one or more solid bed sodium hydroxide treaters 21. The purified alkylate is removed from the treaters by line 22.

In order to demonstrate the utility of the instant invention the following examples are provided.

EXAMPLE I

A sodium hydroxide treating step like that shown in the drawing was installed in a commercial detergent alkylate plant. The crude alkylate contained unreacted paraffins in the $C_9$ to $C_{14}$ range, benzene, alkylbenzenes wherein the alkyl group ranged from 9 to 14 carbon atoms (detergent alkylate), higher molecular weight alkylated aromatics (heavy alkylate), HCl and aluminum chloride. After HCl flashing and aluminum chloride slurry settling, the alkylate mixture contained 0.14 weight percent aluminum chloride and 0.08 weight percent HCl. This crude alkylate was treated in a mixer at a temperature of 160° F. with 70 volume percent based on the volume of the alkylate of an aqueous sodium hydroxide solution of 15 percent concentration. The mixture of alkylate and aqueous sodium hydroxide was charged to a settler wherein the aqueous sodium hydroxide solution was removed as a lower phase and the treated alkylate removed as the upper phase. The treated alkylate was cooled from 160° F. to approximately 105° F. and introduced into a water settler from which the water was drained periodically. The treated alkylate removed from the solid sodium hydroxide treating unit was analyzed and it was found that there was no aluminum chloride or hydrogen chloride remaining in it. No change in composition with respect to the benzene, paraffin, detergent alkylate or heavy alkylate constituting all of the other components was found.

The sodium hydroxide solution from the sodium hydroxide settling unit was recycled to the sodium hydroxide mixer until its pH reached 11.3 at which time it was discarded and fresh solution employed. It was found in the operation of this commercial unit that fouling of reboilers, heat exchangers and the like in subsequent processing was substantially completely eliminated, demonstrating the utility of the processing step of this invention.

It has been demonstrated by the foregoing example that the method of this invention provides for the complete removal of residual aluminum chloride and hydrogen chloride from the alkylate without loss in yield and at the same time eliminates the fouling of subsequent processing equipment.

EXAMPLE II

A commercial detergent alkylate plant was provided with continuous 5 volume percent washing using 3 to 5 weight percent sodium hydroxide. This plant is essentially that described in Example I prior to the installation of the treating as described in Example I. This unit was also provided with a water wash following the sodium hydroxide wash. The plant experienced severe fouling of heat exchangers requiring plant shutdown every two weeks. This plant was then modified as described in Example I with the results described.

EXAMPLE III

Another commercial detergent alkylate plant like that of Examples I and II was designed to employ a 70 volume percent treat using 20 weight percent sodium hydroxide. It was found that sodium chloride precipitated and therefore it was necessary to reduce the concentration of the sodium hydroxide solution to about 15 to 17 weight percent which eliminated the precipitation problem.

Examples II and III demonstrate the criticality of employing sodium hydroxide concentrations in the range of from about 7 to about 17 weight percent.

EXAMPLE IV

Laboratory runs were carried out wherein detergent alkylate was neutralized as described in accordance with the method of this invention at room temperature and at 160° F. The alkylate samples neutralized at room temperature liberated hydrogen chloride when distilled while those neutralized at 160° F. did not. This example demonstrates that there is better neutralization and removal of aluminum compounds at 160° F. than at room temperature and therefore higher temperatures as described should be used.

I claim:

1. A method for treating crude alkyl aromatic fractions resulting from the alkylation of aromatics in the presence of an aluminum chloride catalyst to remove residual quantities of catalyst therefrom, which comprises contacting the alkyl aromatics at a temperature of 110° F. to 170° F. with from 50 volume percent to 150 volume percent based on the volume of crude alkyl aromatic fraction of an aqueous sodium hydroxide solution having a concentration of from 7 weight percent to 17 weight percent of sodium hydroxide, thereafter separating the aqueous sodium hydroxide solution from the treated alkyl aromatic fraction, cooling said treated alkyl aromatic fraction, settling out water from said alkyl aromatic fraction and passing said alkyl aromatic fraction through a bed of solid sodium hydroxide and thereby recovering the said alkyl aromatic fraction substantially free of catalyst.

2. The method according to claim 1 wherein the aromatic nucleus of said alkyl aromatic is benzene and the alkyl group of said alkyl aromatic contains from 10 to 18 carbon atoms.

3. The method according to claim 2 wherein the said alkyl groups are straight chain.

4. The method according to claim 1 wherein the temperature is in the range of from 140° F. to 160° F.

5. The method according to claim 1 wherein the volume percent of the sodium hydroxide solution is in the range of from 60 to 80 volume percent based on the volume of the crude alkyl aromatic fraction.

6. The method according to claim 1 wherein the concentration of the aqueous sodium hydroxide solution is in the range of from 10 to 15 weight percent.

7. The method according to claim 1 wherein the treated alkyl aromatic fraction after separation from the aqueous sodium hydroxide solution is recovered by cooling, settling out water, and thereafter passing it through a bed of solid sodium hydroxide.

8. The method according to claim 1 wherein said alkyl aromatic fraction is an alkyl benzene fraction wherein the alkyl group is straight chain and in the range of from 10 to 14 carbon atoms, the contacting is at a temperature of from 140° F. to 160° F., the volume of the sodium hydroxide solution is in the range of 60 volume percent to 80 volume percent based on the volume of the crude alkyl benzene fraction, and the concentration of the sodium hydroxide solution is in the range of 10 weight percent to 15 weight percent.

References Cited

UNITED STATES PATENTS

| | | |
|---|---|---|
| 3,363,018 | 1/1968 | Cahill et al. |
| 3,433,846 | 3/1969 | Adams et al. |

CURTIS R. DAVIS, Primary Examiner

U.S. Cl. X.R.

260—671 B